United States Patent [19]

Vélu et al.

[11] 4,053,709

[45] Oct. 11, 1977

[54] TELEPHONE CONNECTOR

[75] Inventors: Roger G. Vélu, Franconville; Jean A. Picandet, Paris; François M. Boullier, Saint-Ouen, all of France

[73] Assignee: Jeumont-Schneider, Puteaux, France

[21] Appl. No.: 643,806

[22] Filed: Dec. 23, 1975

[30] Foreign Application Priority Data

Dec. 31, 1974 France .................................. 74.43472

[51] Int. Cl.² .............................................. H04M 7/12
[52] U.S. Cl. .......................... 179/18 AD; 179/18 AH; 179/16 EC
[58] Field of Search ..................................... 179/16 EC

[56] References Cited

U.S. PATENT DOCUMENTS 2,490,036 12/1949 Deakin .............................. 179/27 CA
3,467,786 6/1965 Diesen .............................. 179/18 AD

OTHER PUBLICATIONS

Glossary of Communications, Emerson C. Smith, p. 412.

Primary Examiner—William C. Cooper
Attorney, Agent, or Firm—Bacon & Thomas

[57] ABSTRACT

A telephone junctor for interconnecting an electromechanical and an electronic automatic exchange, the latter using tone signaling and capable of operating in time-division-multiplex. The junctor permits direct inward dialing of a subscriber on the electromechanical exchange by a subscriber of the electronic exchange.

17 Claims, 1 Drawing Figure

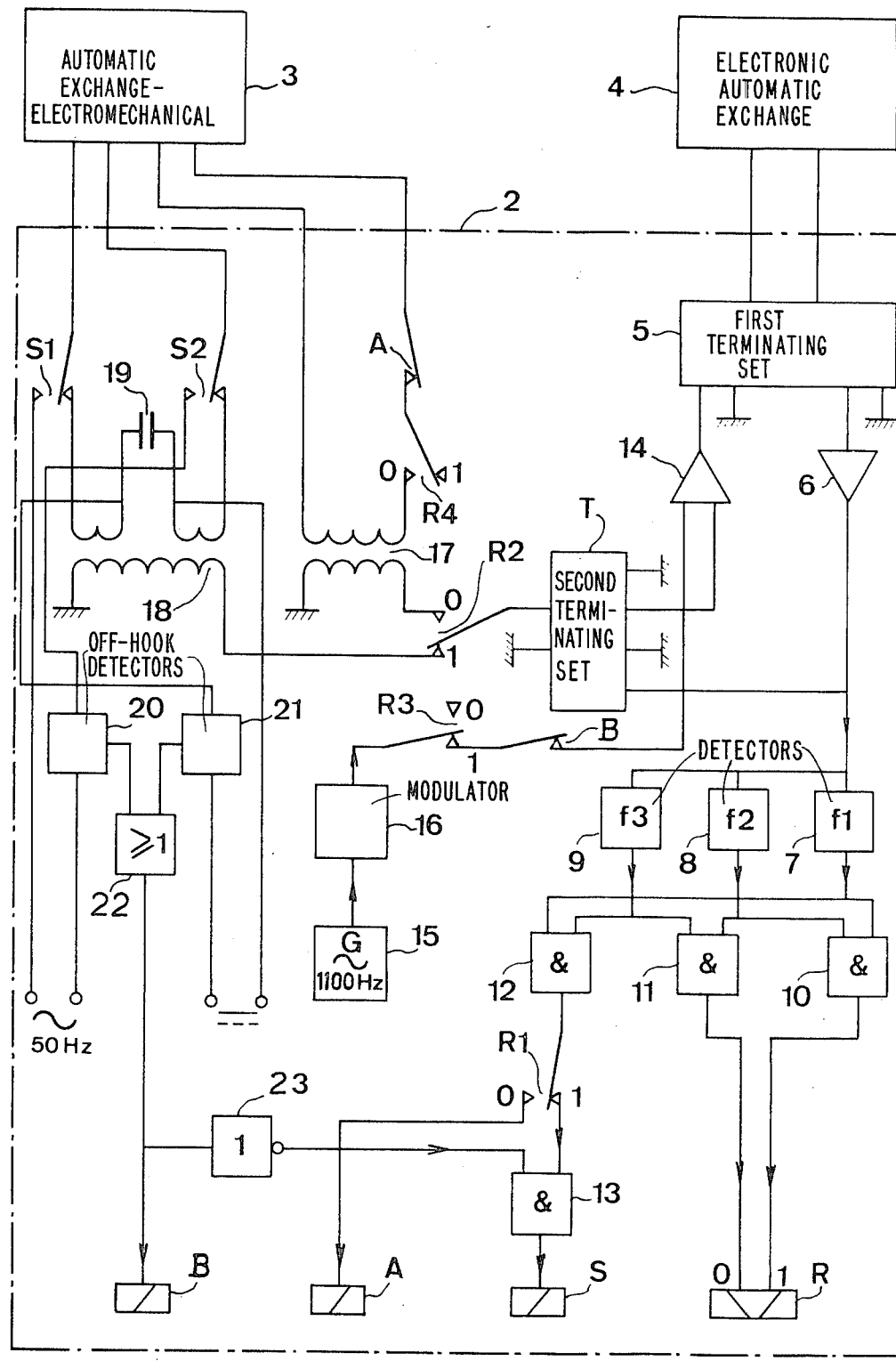

TELEPHONE CONNECTOR

The present invention relates to a telephone junctor for the direct inward dialing of a subscriber connected to a first automatic exchange having public network line equipment and extension subscriber equipment, by a further subscriber connected to a second, distant automatic exchange capable of transmitting signaling at three frequencies towards the said junctor and of interpreting the changes of state of the latter.

The invention relates in particular to cases wherein the second exchange comprises an electronic automatic switching equipment, for example, operating in multiplex by time division, i.e. piloted by an electronic computer, and wherein the first exchange is equipped with an automatic switching equipment of electromechanical type, not provided originally for such direct inward dialing.

It is impossible, with the aid of the technique known at the present day, to interconnect the two exchanges under discussion, for achieving such utilization.

The junctor according to the invention permits this type of working without necessity for modification of existing equipment in the exchanges concerned, the only conditions required being, in the case of the first exchange, to have public network line equipment and extension subscriber equipment, and, in the case of the second exchange, to have available equipment transmitting three-frequency signaling and, since it is piloted by a computer, to be able to insert into the programming of the latter the sub-program necessary for long-distance control of the said junctor, the latter being of course disposed in the vicinity of the first exchange.

The telephone junctor according to the invention is characterized in that it comprises:

a generator for single-frequency signaling the signals of which are modulated by "on-off keying,"

a first terminating set connected at the two-wire side to the second exchange and connected at the four-wire side by its first pair of wires on the one hand to a circuit receiving three-frequency signaling the signals of which are transmitted by the second exchange, the said receiving circuit controlling relays through intermediary of logic elements, and on the other hand to the first channel of the four-wire circuit of a second terminating set, and connected by its second pair of wires to the output of a two-input summing amplifier, the first input of which is subjected to the single-frequency signaling; and the second input of which is connected to the second channel of the four-wire circuit of the second terminating set, the two-wire side of which is connected either to the extension subscriber equipment or to the public network line equipment of the first exchange, depending on the signaling transmitted by the second exchange, an off hook detecting circuit, a source of a.c. supplying the ringing current, and a d.c. source supplying the public network line equipment of the first exchange.

The invention will be better understood with the aid of an example of embodiment and of the accompanying drawing showing the electric wiring diagram of a junctor interconnecting two automatic telephone exchanges.

The said junctor is shown at 2 within a broken-line framework. The two interconnected exchanges are, on the one hand, an automatic exchange 3 comprising an automatic switching equipment of electromechanical type connected to the public network and an automatic exchange 4 having an electronic automatic switching equipment operating in multiplex by time division. Whereas the junctor 2 is disposed in the proximity of the exchange 3, the exchange 4 may be a considerable distance from the preceding elements. The exchange 4 is connected to the junctor 2 by a two-wire line connected to a first terminating set 5 of known type, having a balancing network permitting passage in four-wire circuit, i.e. a first pair of wires feeding, through intermediary of an amplifier 6, on the one hand three frequency detectors 7, 8, 9 connected in parallel and corresponding respectively to frequencies $f1, f2, f3$ of the three-frequency signaling system employed by the exchange 4, and on the other hand the first channel on the four-wire side of a second terminating set T. In order to enhance the reliability of the signaling, the exchange 4 emits two of these frequencies simultaneously, i.e. either $f1 + f2$ or $f2 + f3$ or $f1 + f3$, depending on the operation which requires to be triggered at a distance by the exchange 4 in the junctor 2, as will be precisely set forth later.

The outputs of the frequency detectors 7, 8, 9 serve as inputs for a system of three AND logic elements 10, 11, 12, having two inputs and the inputs of which are connected in pairs, each connection being effected at the single output of one only of the detectors 7, 8, 9.

The logic element 10, the inputs of which are connected respectively to the outputs of the detectors 7 and 8, and the logic element 11, the inputs of which are connected respectively to the outputs of the detectors 8 and 9 have an output feeding a bistable relay R of the four-contact type (R1, R2, R3, R4) having two positions 0 and 1. The element 11 feeds the winding of the relay R corresponding to the position 0 of the said contacts, and the element 10 the winding of the relay R corresponding to position 1 of the said contacts.

The logic element 12, the inputs of which are connected respectively to the outputs of the detectors 7 and 9 has its output connected on the one hand through intermediary of position 1 of the contact R1 to the first input of an AND logic element 13 having two inputs and the output of which feeds a relay S having two off-on contacts S1 and S2, and connected on the other hand through intermediary of position 0 of contact R1 to the winding of a relay A having a single contact.

The second pair of wires, on the four-wire side, of the first terminating set 5 receives the output signal of a summing amplifier 14 having two inputs, the first of which is connected to the mobile element of the contact R2 through intermediary of the second channel on the four-wire side of the second terminating set T, and the second input of which is connected to a single-frequency signaling generator having a frequency $f4$ modulated by on-off keying in accordance with a modulation frequency very much lower than $f4$, $f4$ itself being different from the frequencies $f1, f2, f3$. In order to be entirely specific, in the example given there have been adopted for $f1, f2, f3$, respectively, the frequencies 700, 1300 and 1500 c/s, these frequencies forming a part of those which have been standardized in France by the "Societe Mixte pour le Developpement de la Commutation dans le domaine des Telecommunications SOCOTEL." There has been adopted $f4 = 1100$ c/s, the corresponding sinusoidal signals being modulated by "on-off keying" in such manner as to be present during 12 ms and then absent during 12 ms, and so on. Thus, there is utilized a generator 15 of 1100 c/s sinusoidal signals in series with an "on-off keying" modulator 16, the output of which is connected to the second input of the amplifier 14 through intermediary of the contact R3, on its position 1, in series with a break contact B controlled by a relay winding B, the feeding of which will be discussed precisely later.

The automatic exchange 3 has inter alia extension subscriber equipment, the two wires of which are connected to a winding of a transformer 17 through intermediary of two series contacts, i.e. a break contact A controlled by the winding of the relay A and the contact R4 on its position 0. The second winding of the transformer 17 has one terminal connected to earth and the other terminal connected to the contact member 0 of the contact R2, the mobile element of which is connected to the second terminating set T at the two-wire side. Each of the two wires of the public network line equipment of the exchange 3 is connected to one end of the half-windings of a telephone transformer 18 through intermediary of the break contact member of the contact S1 or S2 respectively, the two half-windings being connected in series through intermediary of a capacitor 19.

The other winding of the telephone transformer 18 has one terminal connected to earth and the other terminal connected to the contact member 1 of the contact R2.

The make contact elements of the contacts S1 and S2 are connected to a 50 c/s feed source (of, for example, 70 V), through intermediary of a first off hook detector 20.

The terminals of the capacitor 19 are connected to a d.c. source (for example, 48 V) through intermediary of a second off hook detector 21.

The off hook detectors 20 and 21 separately control the winding of a relay B through intermediary of an OR logic element 22, the output of which is connected to the second input of the logic element 13 through intermediary of a logic NOT element 23.

On the off hooking taking place during the emission phase of the ringing signal, it is the detector 20 which functions as to provoke excitation of the winding B and de-excitation of the winding S, since the second input of the element 13 changes state under the action of the element 23. When the off hooking takes place during a silence interval of the ringing signal, it is the detector 21 which intervenes, but the final result is the same.

The exchange 4, in application of the particular sub-program which is associated with its intrinsic program due to the presence of the junctor 2, emits at the end of each call the signal $f_1 + f_2$ for positioning the contacts of the relay R on position 1.

The mode of functioning of the junctor 2 is as follows:

First case: A calling subscriber of exchange 4 calls the operator of exchange 3, since he does not know the extension number of the called subscriber.

The exchange 4, in application of the sub-program associated with its intrinsic programming, after having recognized that the calling subscriber is calling the operator, then emits the signal $f_1 + f_2$, which produces excitation of the winding 1 of the relay R through intermediary of the detectors 7 and 8 and the logic element 10.

The contacts R1 to R4 pass into their position 1 — if they are not already there — and this connects the operator to the circuit of the calling subscriber. In accordance with the subprogram, the exchange 4 then emits, in order to ring the operator, the signal $f_1 + f_3$ during 3.3 s followed by 1.6 s interruption, and so on.

The winding of relay S is then periodically excited due to the action of the logic elements 12, 23 and 13; the contacts S1 and S2 commence to beat at the same rhythm, connecting the operator alternatingly to the 50 c/s source (ringing) or to the d.c. source.

If the operator takes her handset off the hook, one of the off hook detectors 20 or 21 emits a signal in the direction of the element 22, i.e. the first if this is during the emission period of the ringing signal, the second if it is during an interval of silence of the ringing signal.

The logic element 22 then permits, due to its output signal, excitation of the winding of relay B; the result thereof is, on the one hand, interruption of the ringer since the second input of the logic element 13 rocks in the other direction, and on the other hand, opening of contact B, the result of which is to cause cessation of emission of the 1100 c/s signal.

The exchange 4 detects the disappearance of this signal and then establishes relationship, by its connecting network, between the calling subscriber and the operator of the exchange 3.

Second case: A subscriber of exchange 4 calls a subscriber of exchange 3, the extension number of which he knows.

The exchange 4, recognizing a call in direct inward dialing, stores the extension number requested and then emits, in accordance with the sub-program, the signal $f_2 + f_3$. Thus, the bistable relay R switches on the position 0 under the action of the logic element 11.

The telephone transformer 18 is cut out of circuit, as also is the 1100 c/s signal, and the transformer 17 is connected to the terminating set T by the contact R2. The contact R4 closes the loop of the extension subscriber equipment of the exchange 3 connected to the junctor 2. The exchange 4 then fulfills, relative to the said extension subscriber or set, the role of a calling subscriber of exchange 3 calling another subscriber of the said exchange, since it remote-controls the necessary operations.

Thus, at the commencement the whole procedure which takes place is as if the extension subscriber should have its handset off the hook. The exchange 3, recognizing such off hooking, emits the dial tone, which the exchange 4 immediately detects, subsequent to which the latter emits the dialing pulses of the called subscriber (from exchange 3), by means of frequencies $f_1 + f_3$ modulated by on-off keying in the cadence of a dialing operation which would be effected with the aid of the conventional dial. Thus, the relay A commences to beat in synchronism with this modulation. The exchange 3 then commences to emit the ringing tone which the exchange 4 detects. The latter then establishes connection between the calling subscriber and the junctor 2, by means of its connecting network.

Third case: A subscriber of exchange 3 calls a subscriber of exchange 4.

The calling subscriber effects the operations necessary for obtaining connection to the public network line equipment connected to the junctor 2. This connecting takes the form of closure of a loop on the public network line equipment, which the detector 21 reveals. The contact B opens and the exchange 4 detects interruption of the 1100 c/s signal, which signifies for this exchange 4 that a subscriber of exchange 3 wishes to call a subscriber of exchange 4.

The exchange 4 then transmits the dial tone. Then, the calling subscriber dials, during which opening of the loop causes the relay B to beat, the result of which is to interrupt, in the dialing cadence, the 1100 c/s signals modulated by on-off keying. The exchange 4 detects these signal trains and, once the dialing of the called subscriber has been analyzed by the control logic system of the exchange 4, the latter will transmit to the calling subscriber the ringing tone, provided that the called subscriber has not taken his handset off the hook. Then, the remainder of the operations takes place in accordance with the conventional process.

The junctor according to the invention permits detection of the off hook of a handset even in the case of long lines, due to the three-frequency signaling; the field of utilization thereof may be extended to the connection of distant telephone devices, in which case no account would be taken of extension subscriber equipment connections.

We claim:

1. Telephone junctor for the direct inward dialing of a subscriber connected to a first automatic exchange having public network line equipment and extension subscriber equipment by a further subscriber connected to a second, distant automatic exchange capable of transmitting three-frequency signalling towards the said junctor and of interpreting the changes of state of the latter, characterised in that it comprises:

a generator of single-frequency signaling the signals of which are modulated by "on-off keying,"

a first terminating set for two wire to four wire conversion connected at the two-wire side to the second exchange and connected at the four-wire side by its first pair of wires to a circuit for receiving three-frequency signaling the signals of which are transmitted by the second exchange, the said receiving circuit controlling relays through intermediary of logic elements, and to the first channel of the four-wire circuit of a second terminating set and, connected by its second pair of wires to the output of a two-input summing amplifier the first input of which is subjected to the single-frequency signaling and the second input of which is connected to the second channel of the four-wire circuit of the second terminating set the two-wire side of which is connected either to the extension subscriber equipment or to the public network line equipment of the first exchange, in accordance with the signaling transmitted by the second exchange, an off hook detecting circuit, an a.c. source supplying the ringing current, and a d.c. source feeding the public network line equipment of the first exchange.

2. A junctor enabling direct inward dialing to a first, electromechanical exchange, from a second tone signaling automatic exchange comprising:

a. first and second terminating sets for connecting four-wire circuits to two-wire circuits, each having a first and a second pair of wires on the four wire side thereof, b. connecting means for establishing connections between said first and second terminating sets, c. said first terminating set receiving on its two-wire circuit an input from said tone signaling automatic exchange, d. frequency detecting means receiving tone signals from said first pair of wires of said first terminating set, e. logic means receiving signals from said frequency detecting means, and f. relay means responsive to said logic means for closing and opening circuit paths responsive to said tone signaling exchange, thereby providing alternative connection to said electromechanical exchange through extension subscriber equipment or through public network line equipment.

3. A junctor as recited in claim 2 further comrising additional relay means responsive to signals from said first electromechanical exchange.

4. A junctor as recited in claim 3 further comprising a modulated signal frequency generator connected to said second pair of wires of said first terminating set responsive to said relay means and to said additional relay means.

5. A junctor as recited in claim 4 wherein said modulated signal frequency generator comprises a single-frequency generator modulated by on-off keying of a keying modulator.

6. A junctor as recited in claim 4 wherein said alternative connection is made by said second terminating set on its two wire circuit, responsive to said relay means.

7. A junctor as recited in claim 6 wherein said connecting means comprises first and second amplifying means, a. said first amplifying means having an input and an output, said input being connected to said first pair of said first terminating set, and said output being connected to said first pair of said second terminating set and to said frequency detecting means, and b. said second amplifying means having an output connected to said second pair of said first terminating set, and first and second inputs,
   i. said first input connected to said modulated signal frequency generator through contacts of said relay means and through contacts of said additional relay means, and
   ii. said second input connected to said second pair of said second terminating set.

8. A junctor as recited in claim 7 further comprising off hook detecting means responsive to said first exchange for controlling said additional relay means.

9. A junctor as recited in claim 8 wherein said off hook detecting means comprises first and second off hook detectors, a. said first off hook detector being responsive to an off hook condition during an emission phase of a ringing signal of said first exchange, and b. said second off hook detector being responsive to an off hook condition occurring during a silence interval of the ringing signal.

10. A junctor as recited in claim 9 wherein said first and second off hook detectors provide signals to an OR-type logic element, thereby activating said additional relay means when either off hook condition is detected.

11. A junctor as recited in claim 8 wherein said second exchange comprises a computer controlled, three-frequency signaling system.

12. A junctor as recited in claim 11 wherein said second exchange transmits two frequencies at a time, thereby enhancing reliability.

13. A junctor as recited in claim 12 wherein said second exchange comprises a time-division-multiplexed apparatus.

14. A junctor as recited in claim 11 wherein said frequency detecting means comprises first, second and third frequency detectors.

15. A junctor as recited in claim 14 wherein said logic means comprises first, second and third AND logic elements, wherein a. said first logic element receives outputs of said first and second frequency detectors,
b. said second logic element receives outputs of said second and third frequency detectors,
c. said third logic element receives outputs of said first and third frequency detectors,
d. said first and second logic elements together control a bistable relay having four contacts, and
e. said third logic element controls a single contact relay and a two contact relay, responsive to one of said four contacts of said bistable relay.

16. A junctor as recited in claim 15 wherein said two-contact relay is activated by a fourth AND logic element having first and second inputs, a. said first input receiving an output of said third logic element through said one of said four contacts of said bistable relay, and
b. said second input receiving an output of a NOT logic element receiving its input from said off hook detecting means.

17. A junctor as recited in claim 16 further comprising first and second transformer means for providing said alternative connection between said second terminating set and said first exchange.

* * * * *